Dec. 29, 1942.  W. E. SYKES  2,306,910
GEAR GENERATOR
Filed Dec. 28, 1938   8 Sheets-Sheet 1

Fig. 1

Inventor
William E. Sykes
By Albert R. Henry
Attorney

Dec. 29, 1942.   W. E. SYKES   2,306,910
GEAR GENERATOR
Filed Dec. 28, 1938   8 Sheets-Sheet 2

Inventor
William E. Sykes
By Albert R. Henry
Attorney

Dec. 29, 1942.  W. E. SYKES  2,306,910
GEAR GENERATOR
Filed Dec. 28, 1938  8 Sheets-Sheet 3

Inventor
William E. Sykes
By
Albert R. Henry
Attorney

Dec. 29, 1942.  W. E. SYKES  2,306,910
GEAR GENERATOR
Filed Dec. 28, 1938   8 Sheets-Sheet 4

Inventor
William E. Sykes
By Albert R. Henry
Attorney

Dec. 29, 1942. W. E. SYKES 2,306,910
GEAR GENERATOR
Filed Dec. 28, 1938 8 Sheets-Sheet 5

Fig. 9

Inventor
William E. Sykes
By Albert R. Henry
Attorney

Dec. 29, 1942. W. E. SYKES 2,306,910
GEAR GENERATOR
Filed Dec. 28, 1938 8 Sheets-Sheet 6

Inventor
William E. Sykes
Albert R Henry
Attorney

Dec. 29, 1942.     W. E. SYKES     2,306,910
GEAR GENERATOR
Filed Dec. 28, 1938     8 Sheets-Sheet 7

Inventor
William E. Sykes
By Albert R. Henry
Attorney

Dec. 29, 1942. W. E. SYKES 2,306,910
GEAR GENERATOR
Filed Dec. 28, 1938 8 Sheets-Sheet 8

Inventor
William E. Sykes
By
Albert R. Henry
Attorney

Patented Dec. 29, 1942

2,306,910

UNITED STATES PATENT OFFICE 2,306,910

GEAR GENERATOR

William E. Sykes, Manor Works, Staines, England

Application December 28, 1938, Serial No. 248,090
In Great Britain October 29, 1938

12 Claims. (Cl. 90—7.5)

This invention relates to improvements in machines for cutting gears of the straight or helical type.

The invention is more particularly directed to machines which operate on the molding-generating principle of action, more commonly termed gear shapers. An object of the invention is to provide a machine of this type which will readily adapt itself to modern mass production without the sacrifice of accuracy in the cutting operations. The machine will therefore be found to include novel structures, all devised with a view to mutual cooperation, simplicity of action, and adaptability to high speed production.

In its more specific aspect, the machine includes a vertical arrangement of the tool spindle, together with several novel bearing organizations, to protect the driving connections of the cutter head against destructive stresses.

The work holding portions of the machine include a work saddle and an in-feed mechanism therefor, which automatically feeds the work toward the cutter in intermittent steps, and finally withdraws the work when the machining operation is completed. These units are operated through a compact driving mechanism which is arranged to permit ready access and adjustment, so that the machine may be set up to produce gears of a wide range of sizes and types with a minimum of effort.

The various novel features and principles of the invention and the operating advantages to be derived from the use thereof will be more apparent by a perusal of the following description and the accompanying drawings.

Figure 2:
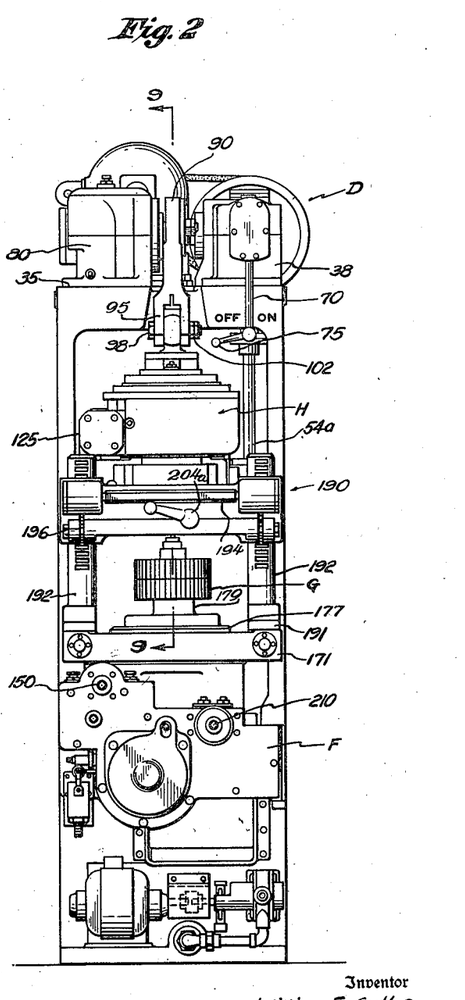
Figs. 2 and 3 are front and rear elevations respectively.
Figure 3:
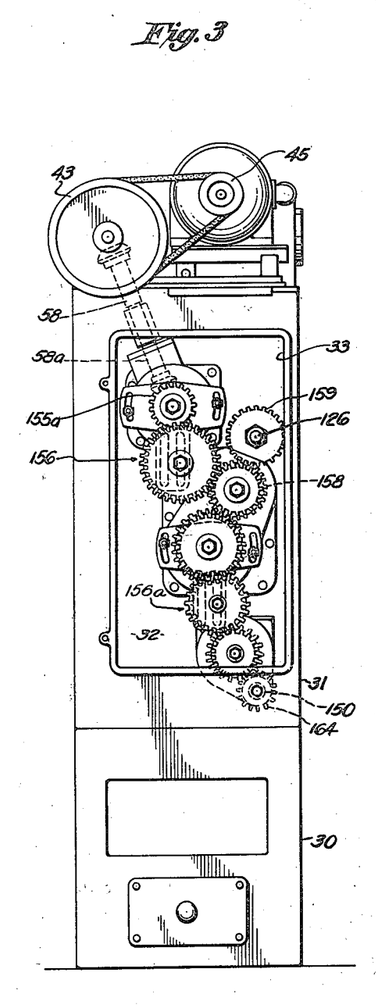

The machine operates on the so-called shaping-generating principle of action, wherein a cutter C and a gear blank G (Fig. 1) revolve together as if in perfect mesh, while the cutter additionally reciprocates axially in simulation of a shaper cutting stroke. In the use of the present machine, the chief duty of the operator is to remove the finished gear or gears, and to affix new blanks in the work saddle, since the operating cycle including the infeed of the blank, stopping of the machine, and repositioning of the work saddle, may be made entirely automatic. One operator may therefore attend a number of machines, which, as will be observed in Fig. 2, are relatively narrow and straight sided, so that they may be arranged in a compact battery. It will be noted that various adjustable means are conveniently located on the front or operating side of the machine, while the timing gears are all accessible through the rear of the machine housing, as shown in Fig. 3.

Figure 1:
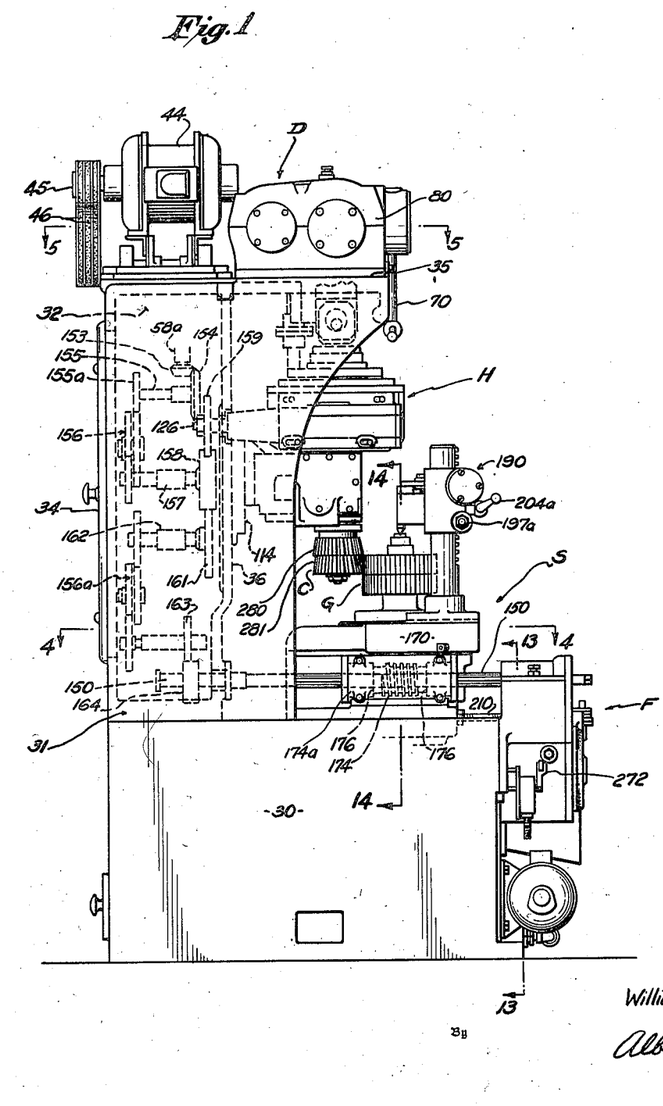
Fig. 1 is a side elevation of the gear shaper.

The machine frame includes a base 30 and a superimposed pedestal 31, which is formed with a timing gear compartment 32 having a rear opening 33 covered by a door 34 (Fig. 1). The flat top 35 of the pedestal 31 receives the drive unit D of the machine, while the front wall 36 of the compartment 32 serves as a support for the cutter head unit H. The remaining major components of the machine, consisting of the work saddle unit S and the in-feed unit F, are disposed on the base 30.

The drive unit

A main gear housing 38 (Figs. 2 and 5) is secured to the right hand side of the pedestal top 35, and it contains bearings 39, 41, 42 for a drive shaft 40, which protrudes from the rear of the housing and receives a multiple pulley 43. A motor 44 mounted on the top 35 has a similar pulley 45 secured to its shaft, and it is connected to operate the pulley 43 by V belts 46. Bevel gears 48, 49 are keyed to the shaft 40, and they mesh with gears 51, 52 which are carried by countershafts 53, 54 respectively. A third bevel gear 55, rotatably carried on the shaft 40 and positioned by a spacing sleeve 56, meshes with a bevel gear 57 keyed to an angularly disposed countershaft 58 (Fig. 6). A clutch connection is provided to connect the gear 55 to the shaft 40 in a manner presently to be described.

The positively driven countershafts 53 and 54 are connected to mechanisms which respectively cause reciprocation of the cutter and the timed relief movement of the cutter head, while the motion of the last mentioned countershaft 58 controls the generating or timed rotary movements of the cutter and gear blank, as well as the in-feed for the gear blank. It is important that the operator have an emergency control for rapidly stopping the progress of the automatic cutting cycle previously mentioned, and this is provided by the clutch connection between the gear 55 and the drive shaft 40 which permits instant cessation of the generating and in-feed movements without the necessity of stopping the motor 44.

Figures 4, 8, 16:
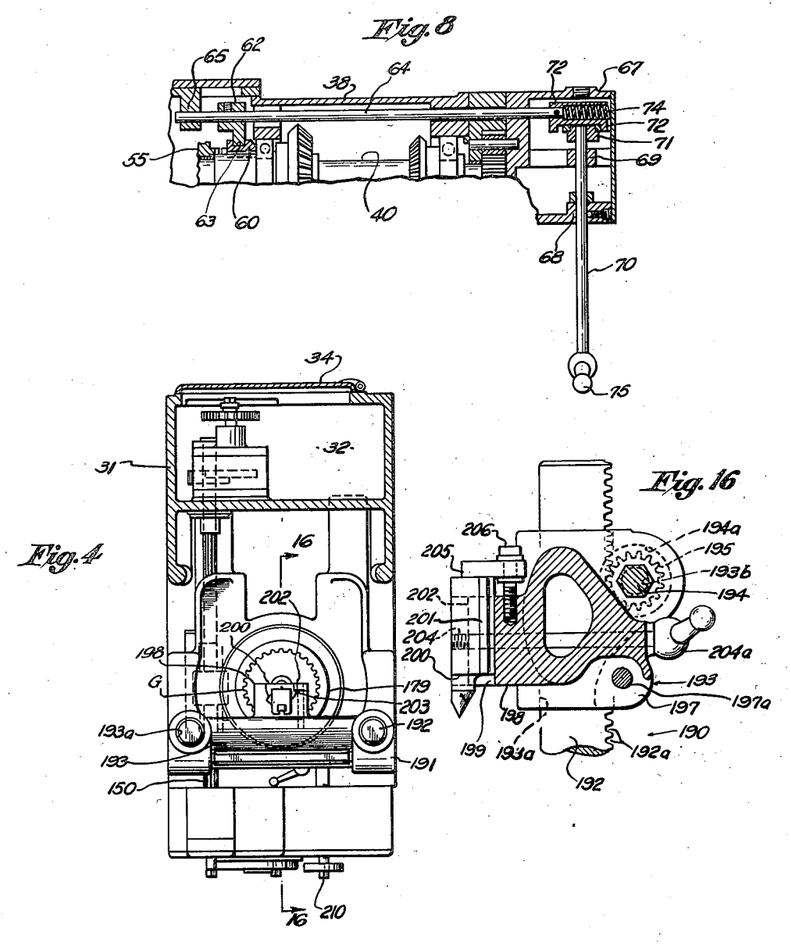
Fig. 4 is a section on the line 4—4 of Fig. 1.
Fig. 8 is a fragmentary section on the line 8—8 of Fig. 5, showing the clutch operating device.
Fig. 16 is a section on the line 16—16 of Fig. 4, showing details of the tailstock structure.
Figure 5:
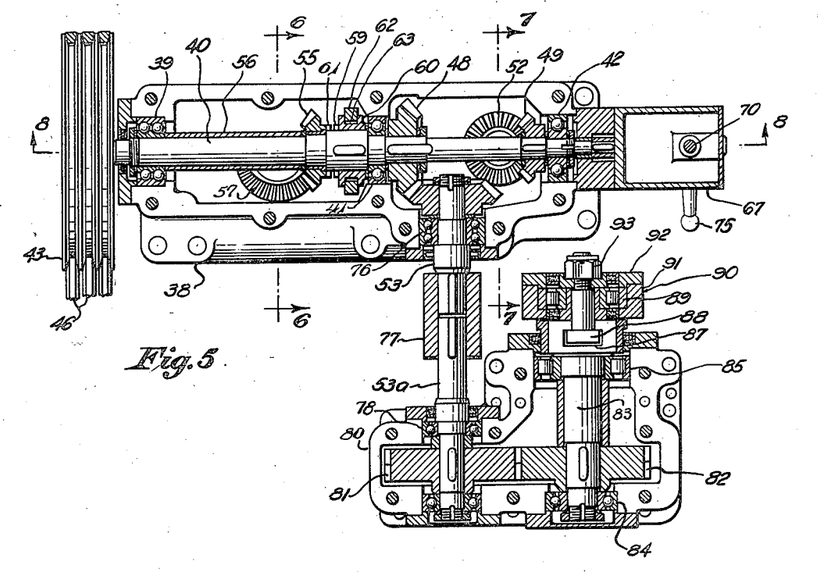
Fig. 5 is an enlarged section on the line 5—5 of Fig. 1, showing the top drive mechanism.
Figure 6:
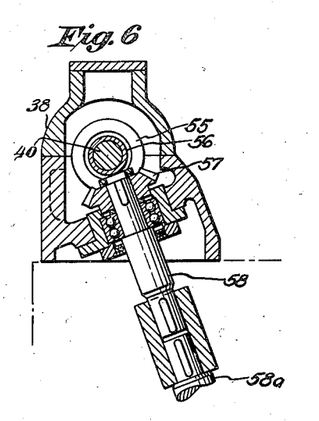
Figs. 6 and 7 are sections on the lines 6—6 and 7—7 respectively of Fig. 5.

As will be seen in Figs. 5 and 8, the connection includes a clutch element 60 which is slidably keyed to the shaft 40, and which is formed with teeth 59. The gear 55 is formed with complementary clutch teeth 61. An actuator yoke 62 engages a groove 63 in the element 60, and it is secured to a rod 64, one end of which is carried in a bearing 65, while the other end projects through the front of the housing 38. A small casing 67 (Fig. 8) is secured to this portion of the housing, and it contains vertically aligned bearings 68, 69 for a control shaft 70, to the upper end of which is secured an eccentric 71. An eccentric strap 72 engages the eccentric 71, and it is secured to the projecting end of the rod 64, and the strap additionally receives a spring 74 which engages the outer wall of the casing 67, and thus constantly thrusts the rod inward. The lower extremity of the shaft 70 is supplied with a lever 75, which, when turned to the right from the position of Fig. 2, moves the eccentric so that the rod 64 and accompanying clutch element 60 are moved inward to connect the element with the gear 55.

Referring now to the horizontal countershaft 53 (Fig. 5), it will be observed that it projects through a bearing 76 in the housing 38 and is connected to a companion shaft 53a by a coupling 77. The latter shaft is mounted in bearings 78 in an adjacent gear box 80, and it carries a gear 81 which meshes with a gear 82 secured to a crankshaft 83. The crankshaft is carried in bearings 84, 85 in the gear box, and its projecting extremity is formed with a T-slot 87 for receiving a stud 88 which serves as an adjustable crank pin. A roller bearing structure 89 which is fitted to the crank pin receives the big end 91 of a connecting rod 90, and the bearing structure and crank pin are held in place by a cover plate 92 and a clamping nut 93 on the pin 88. The connecting rod 90 will also be observed in Fig. 9. It will be apparent that by loosening the nut 93 and sliding the pin in the T-slot 87, the effective stroke of the connecting rod may be varied. As will presently be described, the connecting rod imparts reciprocatory movement to the cutter C, and thus the stroke adjustment permits the cutter to be adapted to the width of the gear blank or blanks about to be machined.

The cutter unit

Figure 9:
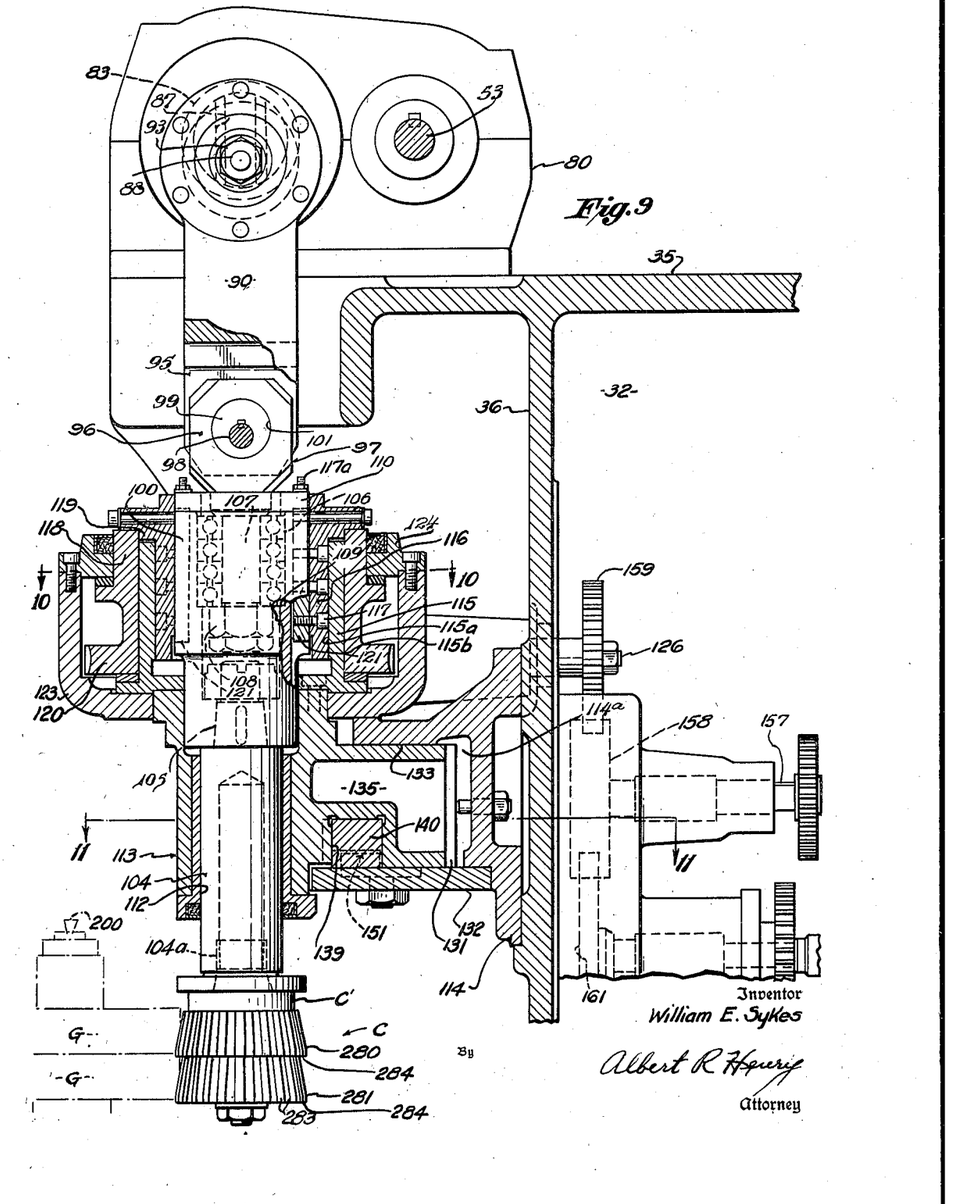
Fig. 9 is an enlarged section on the line 9—9 of Fig. 2, showing the driving connections of the cutter head.
Figure 10:
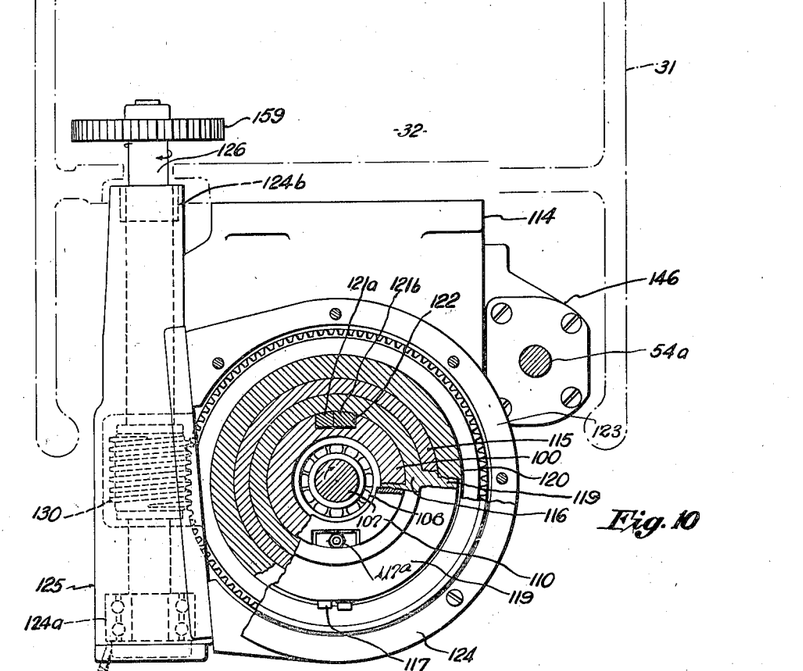
Fig. 10 is a section on the line 10—10 of Fig. 9.

The lower end of the connecting rod 90 is bifurcated as indicated by the numeral 95 (Figs. 2 and 9), to receive the head 96 of a stud 97 which serves as a link connection to the guide or cross-head structure of the cutter unit (Figs. 9 and 10). The end 95 receives a wrist pin in the form of a bolt 98 having an eccentric 99 keyed to it. The eccentric is mounted in a bearing 101 in the stud 97. The eccentric is normally retained in a fixed position by the clamping force applied by nuts 102 on the bolt 98 (Fig. 2). It will be apparent that the eccentric may be clamped in any desired position, thus serving as an adjustable connection between the connecting rod and the cross-head.

The cross-head consists of a guide 100 and a spindle 104 which are rigidly secured together by a connection 105. The guide is bored to receive a multiple ball bearing structure 106, the inner races of which are rigidly clamped to the stem 107 of the stud 97 by lock nuts 108. The outer races of the bearing structure are retained between a shoulder 109 in the guide bore and a thrust plate 110 which is secured to the upper end of the guide 100. The cross-head, although thus definitely coupled to the connecting rod 90, is additionally rotatably mounted on the stud 97 through the bearing structure. The spindle 104 of the cross-head is formed with a threaded hole 104a, which serves to receive a tool post C' to which the cutter C is secured. Instead of the ball bearing structure 106, one or more thrust rings may be employed to connect the cross-head and stud 97.

The spindle 104 is supported by a vertical bearing 112 forming part of a cutter head 113 which in turn is carried by a bracket 114 secured to the front wall 36 of the pedestal 31 (Figs. 9 and 10). A cylindrical bushing 115 is secured to the top of the head 113, and its inner bearing wall 115a is concentrically spaced from the guide 100 to receive rotatably an interposed sleeve 116. A worm wheel 120 is bored to fit the outer wall 115b of the bushing 115, and it is also formed with an elongated hub 118 which extends upward for connection with the flange 119 of the sleeve 116.

The worm wheel 120 and sleeve 116, which may be considered a unitary structure in effect, are connected to the guide 100 of the cross-head by keys 121, which are carried by the sleeve 116 and which engage in straight keyways 122 in the guide 100. As will be seen in Figs. 9 and 10, each key 121 is formed of two complementary, wedge-shaped sections 121a, 121b, one of which is rigidly secured to the sleeve by screws 117. The other section 121b is axially movable by an adjusting screw 117a to permit takeup for wear.

A casing 123, secured to the upper end of the cutter head 113, and a cover 124 which is secured to the casing, form a protective enclosure for the worm wheel 120. A worm casing 125 is secured to the left hand side of the casing 123 (Fig. 10) and it contains suitable bearings 124a, 124b, for a worm shaft 126, which projects through an opening 127 in the wall 36 and into the timing gear compartment 32. A worm 130, carried by the shaft 126, drives the worm wheel 129, and with it the attached sleeve 116.

As thus far described, it will be apparent that as the cross-head is reciprocated by the crank mechanism, it also receives a rotary movement through the drive afforded by worm 130, worm wheel 129, and the key connection between the guide 100 and the sleeve 116.

Cutter relief mechanism

Figure 11:
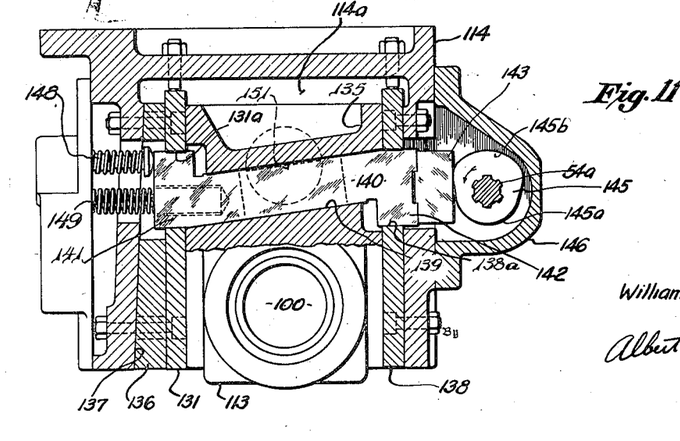
Fig. 11 is a section on the line 11—11 of Fig. 9, showing the cam arrangement for obtaining the relief movement of the cutter head.

Referring again to the cutter bracket 114, it will be noted that the lower portion thereof (Figs. 9, 10, and 11) is formed with a chamber 114a, in which are disposed attached side plates 131, 132, and a bottom plate 132, which, together with the wall 133 of the bracket, form a box bearing for receiving the rectilinear projection 135 of the cutter head 113. A wedge plate 136 is interposed between one plate 131 and the adjacent wall 137 to provide lateral adjusting means for the bearing structure. The lower surface of the cutter head contains a square way 139 which is angularly disposed and is adapted to receive a cam member 140. The square ends 141, 142 of the cam member are received in laterally aligned bearing apertures 131a, 138a in the side plates 131 and 138.

Figure 7:
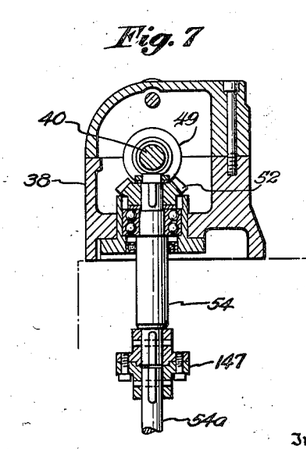

A tappet 143 is secured to the end 142 of the cam member 140, and it is engaged by a cam 145 which is secured to a vertical shaft 54a. This shaft is carried in a suitable bearing in a box 146 secured to the side of the bracket 114 and it extends upward for connection with the countershaft 54 by a coupling 147 (Fig. 7).

The timing of the drive mechanism is such that during each reciprocatory cycle of the described cross-head (i. e., the downward and the return movement), the cam 145 performs a complete revolution. During the initial part of the downward or active cutting stroke of the cross-head, the large cam member 140 is thrust to the right (Fig. 11) by springs 148, 149, until the cutter head is slid outward to its full extended position against a stop member 151, which is secured to the plate 132. During this portion of the stroke, the rotating cam 145 presents its dwell portion 145a to the tappet 143, and is just clear of the tappet, and thus does not touch the cam member 140. However, as the end of the cutting stroke is reached, the lobe 145b of the cam engages the tappet 143 and thrusts the cam member 140 to the left against the urge of the springs 148, 149. This causes the cutter head to recede slightly within the box bearing of the bracket 114 to a relief position which is retained during the upward stroke of the cross-head.

*Timing gear unit*

The previously mentioned clutch controlled countershaft 58 (Figs. 3 and 6) extends through an aperture in the pedestal top 35 and into the compartment 32 where it is coupled to an aligned shaft 53a. From this point the gearing is disposed and proportioned to transmit the proper relative speeds to the worm shaft 126, which causes rotation of the cross-head, and a work shaft 150 which drives the work and in-feed units S and F.

As shown diagrammatically in Figs. 1 and 3, the shaft 58a carries a bevel gear 153 which meshes with a gear 154 carried by a horizontal shaft 155. The latter shaft carries a second gear 155a which drives a reducing gear cluster 156, the final shaft 157 of which carries a gear 158. From here the drive is split, as two opposed gears 159 and 161 mesh with the gear 158, the former being attached to the worm shaft 126 and the latter being attached to a shaft 162, which drives a second gear cluster 156a. The final gear 163 of the second gear cluster meshes with a gear 164 which is secured to the work shaft 150.

The gear clusters 156, 156a each include a group of gears which are removable and replaceable by other gears when it is desired to change the speed ratio between the worm and work shafts 126, 150 and/or between the main drive and both of these shafts. Inasmuch as clusters of this nature are well known in the mechanical arts, a detailed description thereof does not appear necessary, save to mention that they are disposed in a position (Fig. 3) where they are conveniently accessible through the rear opening 33 in the timing gear compartment 32.

*Work saddle unit*

A saddle 170 (Figs. 1, 4, and 14), mounted for sliding movement on the machine base 30, is provided with gibs 166, 167 which are received in complementary ways 168 in the base. A cover 171 is secured to the saddle, and it and the saddle are supplied with aligned bushings 170a, 171a, which receive a rotatable work spindle 180. The spindle is formed with a central radial flange 172 which is retained between thrust surfaces 170b, 171b of the saddle and cover respectively by interposed thrust washers 169, 173.

The spindle 180 is rotated by a worm 174 which meshes with a worm wheel formation 175 on the periphery of the spindle flange 172. The worm 174 is slidably splined to the previously mentioned work shaft 150, and it is carried in bearings 176 located in a worm casing 174a which is secured to the side of the saddle 170. It will be observed that the bearings 176 position the worm against axial movement so that as the saddle is moved the worm is carried with it along the axially fixed shaft 150.

A table 177 is secured to the upper end of the spindle 180, and it serves as a mounting base for the gear blank or blanks G which may be carried on an arbor 179, which is secured in the bore 180a of the spindle.

Where the relative proportions of the work demand it, a tailstock 190 is utilized to support the upper end of the work arbor 179. As shown in Figs. 1, 2, and 4, the tailstock includes a base 191 which is secured to the cover 171 of the saddle and which carries spaced vertical guide pins 192 having rack formations 192a thereon. A yoke 193 is formed with vertical bearings 193a, which slidably receive the pins 192, and horizontal bearings 193b for receiving a shaft 194 (Fig. 16). Gears 195 are secured to the shaft 194, and they are housed in pockets 194a in the yoke 193 and are disposed to mesh with the rack formations 192a on the pins and thus assure proper parallel movement of the yoke when it is adjusted to various heights. The bearings 193a are split, as indicated by the numeral 196, and they are formed with drilled lugs 197 for receiving a bolt 197a which is utilized to lock the yoke to the pins 192.

The yoke 193 is formed with a central projection 198 which contains a vertical gib portion 199 for receiving a dead center 200, whose body is formed with a complementary gib portion 201. A clamping slide strip 202 is disposed to engage a second gib portion 203 on the center 200, and it is tapped to receive a transverse screw 204 which projects through to the front of the yoke 193 where it receives a handle 204a. A plate 205, which is secured to the top of the center 200, is carried by a vertical screw 206 disposed in a suitable tapped hole in the projection 198. The screw 206 may be operated to raise or lower the plate 205 and accompanying center 200 to proper adjustment, whereupon the center 200 is rigidly clamped by turning the handle 204a which draws up the clamping strip 202.

*In-feed unit*

A rod 210 (Fig. 13) which is secured to the saddle 170 projects into the adjacent in-feed unit F, and it is operated by the mechanism of the unit to move the saddle step by step towards the cutter, until the full depth of the gear tooth is attained, whereupon the rod and accompanying saddle are automatically withdrawn. As shown in Fig. 14, the rod is threaded to enter a tapped hole 211 in the saddle, and is locked thereto by a suitable lock nut.

Figure 13:
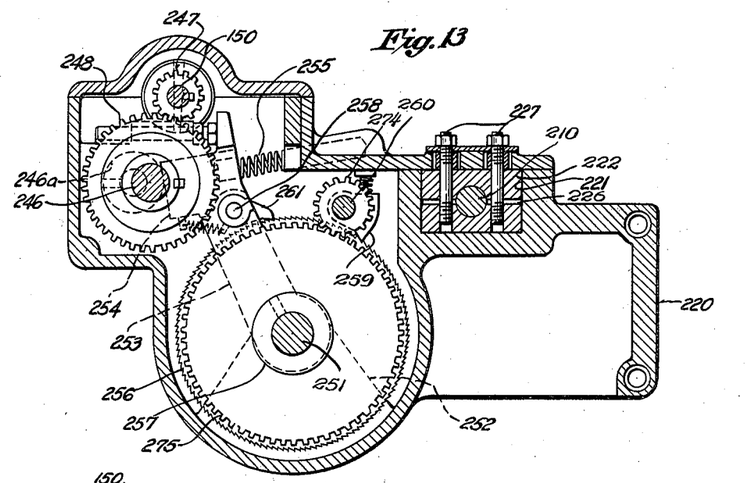
Fig. 13 is an enlarged section on the line 13—13 of Fig. 1, showing the driving connections of the in-feed mechanism.
Figure 14:
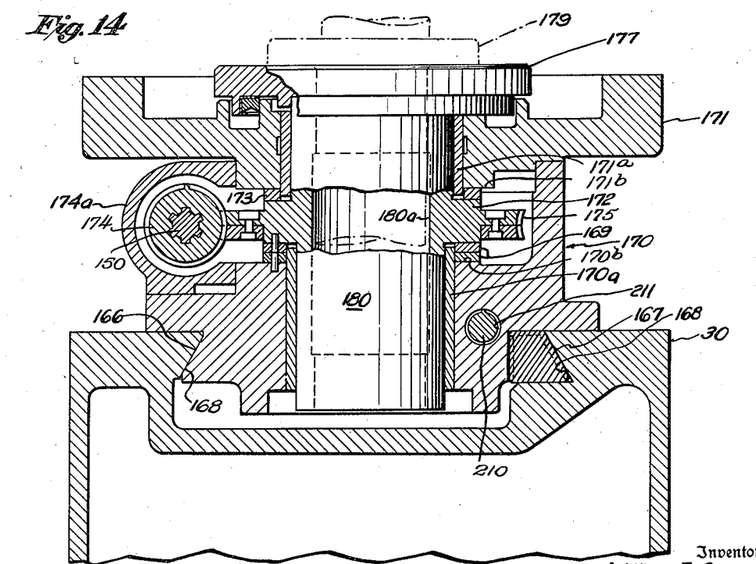
Fig. 14 is an enlarged section on the line 14—14 of Fig. 1, showing the work saddle details.
Figure 15:
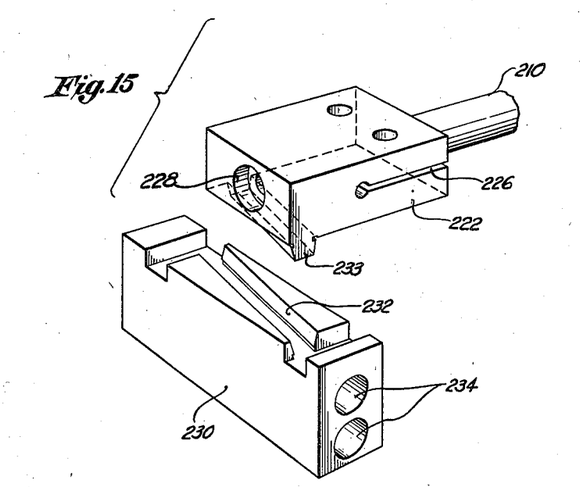
Fig. 15 is a perspective view of the work saddle cross-head and the complementary in-feed cam block.

The unit F includes a housing 220 having a horizontal slide portion 221 which receives a slide block 222 (Figs. 13 and 15). The rod 210 projects through a hole 228 in the block and it is secured against axial displacement in the bearing structure by lock nuts 225. The block 222 is slotted as indicated by the numeral 226, and screws 227 are transversely positioned through the slotted portion to provide a clamp for securing the rod against rotation in the block bearings.

The rod 210 projects through the block 222 to the front of the machine, where it may be manually operated when it is desired to adjust the position of the saddle.

Figure 12:
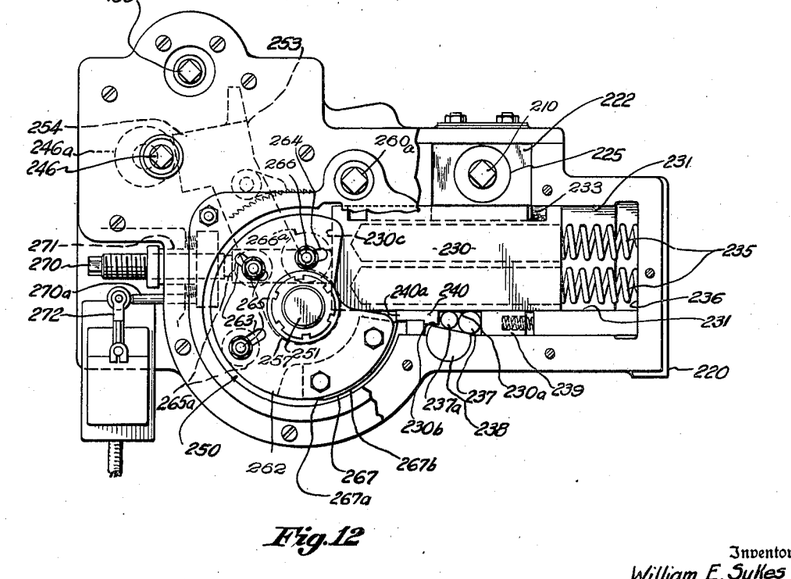
Fig. 12 is an enlarged front view of the in-feed control mechanism, with the cover broken away.

A transversely positioned control block 230 is disposed immediately beneath the forward end of the block 222 and it is guided in transverse rails 231 formed in the housing 220 of the in-feed unit. The upper surface of the control block 230 contains an angular cam groove 232 (Fig. 15), while the adjoining surface of the block 222 is formed with a complementary cam portion 233. The control block contains sockets 234 for receiving compression springs 235 which bear against the adjacent wall 236 of the housing 220 and thus urge the block to the left (Fig. 12). The control block is automatically locked against such spring-impelled movement by a mechanism consisting of rollers 237, 237a, which are disposed between the lower surface 230a of the control block and the angular surface 230b of a hardened insert 238, which is affixed to the housing 220. The rollers are constantly urged into locking position by a spring-pressed plunger 239 which is likewise disposed beneath the control block. A release finger 240 is located to the left of the rollers, and it is formed with a projection 240a which, as will presently be described, is engaged by other mechanism whereby the rollers are moved to the right to release the control block for the spring-impelled movement.

It will be apparent that when the control block 230 is moved to the right, the saddle slide block 222 and accompanying saddle 170 are moved toward the cutter C. At the same time the springs 235 are compressed in preparation for release of the block 230, and when such release occurs, the control block is moved to the left and the saddle is accordingly moved away from the cutter.

The advance movement of the control block,— that is, movement to the right thereof, which results in advance of the saddle toward the cutter, is operated by a control mechanism driven by the work shaft 150. This shaft extends into the housing 220 where it is carried in suitable bearings. An adjoining cam shaft 246, which is mounted in suitable bearings in the housing 220, is driven by the shaft 150 through gears 247, 248 secured to the shafts. The cam shaft 246 carries a cam 246a which operates a ratchet mechanism for driving a control mechanism 250 for advancing the control block.

The control mechanism includes a fixed shaft 251 which is secured in a boss structure 252 in the housing 220 and which rotatably carries a pawl arm 253. A lobe 254 on the extremity of the pawl arm is retained in contact with the cam 246a by a compression spring 255. A ratchet wheel 256 which is secured to a bearing sleeve 257 on the fixed shaft 251 is engaged by a spring-pressed pawl 261 carried by a stud 258 on the ratchet arm 253. A spring-pressed ratchet 259, conveniently carried on an adjacent shaft 260, which will be described later, engages the ratchet wheel against retrogressive movement. As thus far described, it will be seen that as the cam shaft 246 is rotated, the pawl arm 253 is oscillated to cause intermittent rotation of the ratchet wheel 256 in a clockwise direction.

The bearing sleeve 257 also carries a control disc 262 which contains spaced radial slots 263 and an angular slot 264 for receiving studs 265, 266 on which cam rollers 265a, 266a are rotatably mounted. A segmental cam insert 267 is secured to the disc, and it projects therefrom in the same plane as the rollers. The rollers, in counterclockwise order, are positioned at progressively greater radial distances from the axis of the disc 262, and, as the disc is rotated, they successively engage the left face 230c of the control block 230, and thereby move the block to the right. In Fig. 12, the first roller 266a has just engaged the block to start the feed cycle of the saddle, and it is followed by the second and third rollers, and finally the cam insert 267. The cam insert has a cam face 267a and a radial dwell face 267b, the former face engaging and moving the block 230 a slight distance to give a final and finishing movement to the saddle, and the latter face retaining the block in such final position for a considerable period.

The cam insert 267 is a little wider than rollers 265a, and the extra width makes contact with and thrusts the release finger 240 to the right, and, as it leaves the contact face 230c of the control block, it temporarily holds the finger 240 in such depressed position to permit the block to be restored to its first position by the springs 235. As the block returns, it strikes a spring-pressed plunger 270 (dotted lines, Fig. 12) which is carried for sliding movement in a bearing 271 in the housing. As the plunger is moved to the left, a pin 270a, carried thereby, engages and throws a switch arm 272 to open the circuit of the motor 44, thus stopping all movement of the machine elements.

To restart the machine, it is necessary to turn the control disc 262 manually a slight distance to permit release of the plunger 270 and the closing of the switch arm 272. This starting mechanism includes the previously mentioned shaft 260 which is mounted in suitable bearings in the housing and which protrudes from the housing and is formed with a square end 260a for receiving a suitable crank. The shaft 260 carries a pinion 274 which meshes with a gear 275 carried by the control sleeve 257.

*General operation*

The machine may be operated to produce simultaneously a plurality of gears of relatively narrow face dimensions, or in the alternative to machine a single gear having a wide face. One method of setting up the machine to provide a group cutting operation is shown in Fig. 1. As here illustrated, the cutter C consists of similar cutter elements 280, 281, carried by the tool post C' which in turn is carried by the spindle 104 of the cutter unit cross-head.

The cutter elements are in the form of pinions having cutting teeth 283 which are axially aligned, and whose cutting edges 284 lie in the same common reference surface. A multi-edged cutter is thus provided, wherein the axial spacing of the elements is equal to the face width of the blanks G which are carried in parallelism on the adjoining work spindle. For proper operation of the machine, the stroke of the cross-head is adjusted so that it is slightly greater than the axial pitch of the cutter elements, with the result that an overlap of the strokes of adjacent elements is obtained. Inasmuch as the cutting elements are of identical formation, the gear blanks are formed with teeth which are uniform in character and which are devoid of tool marks or any disfigurement.

Where it is desired to dispense with the short stroke method above outlined, the cutter may be of the usual single form. In this instance the usual practice may be followed in adjusting the stroke of the cutter to be slightly greater than the face width of the gear blank. It will be understood that the cutters may be of either the straight tooth or helical types. In the use of helical cutters, the cross-head guide 100 must be modified to contain helical keyways to obtain an additional helical twist during each stroke, as is well known in the art.

I claim:

1. In a gear shaper, a cutter head having a bearing, a cross-head carried for sliding movement in the bearing, a cutter secured to the cross-head, means for reciprocating the cross-head including a connecting rod, a multiple bearing structure disposed axially within the cross-head, said structure having outer races secured against axial movement to the cross-head, a stud carried by the connecting rod and having a stem extending through the bearing structure, means securing the stem to the inner races of the bearing structure, rotatable means carried by the cross-head having a key connection with the cross-head, a bracket carrying the cross-head for guided relief movement transverse to the axis of the cross-head, and drive means for the cutter head operating in timed relation to the operation of the cross-head.

2. In a gear shaper, a cross-head having a cutter attached thereto, means for rotating the cross-head, means operating in timed relation to the rotating means for imparting reciprocatory movement to the cross-head including a connecting rod, a multiple ball bearing structure having outer races secured against axial movement in the cross-head, and a link member carried by the connecting rod and secured against axial movement to the inner races of the bearing structure.

3. In a gear shaper, a cross-head having a cutter attached thereto, means supporting the cross-head for guided axial movement, means for rotating the cross-head, means operating in timed relation to the rotating means for imparting reciprocating movement to the cross-head, and a rotary connection between the reciprocating means and the cross-head including an axial bearing structure in the cross-head, a member retained in the bearing structure for relative rotary movement with respect to the cross-head, and a pivotal connection between the member and said reciprocating means.

4. In a gear shaper, a cross-head having a cutter attached thereto, means supporting the cross-head for guided axial movement, means for rotating the cross-head, means operating in timed relation to the rotating means for imparting reciprocatory movement to the cross-head including a crank driven connecting rod, a rotary connection between the connecting rod and the cross-head including an axial bearing structure in the cross-head, a member retained in the bearing structure for relative rotary movement with respect to the cross-head, and a pivotal connection between the member and said reciprocating means, and means for moving the supporting means transversely with respect to the axis of the cross-head to provide a relief movement.

5. In a gear shaper, a cutter head having a bearing, a cross-head carried for sliding movement in the bearing, a cutter secured to the cross-head, means for reciprocating the cross-head, a rotary connection between said means and said cross-head, means for rotating the cross-head including a sleeve disposed about the cross-head and having a sliding key connection therewith, a cylindrical bushing surrounding the sleeve and secured to the cross-head, a rotatable member carried externally by said sleeve, means connecting the sleeve and member, and axial bearing means engaging the rotatable member and sleeve to prevent axial movement thereof.

6. In a gear shaper, a cutter head having a bearing, a cross-head carried for sliding movement in the bearing, a cutter secured to the cross-head, means for reciprocating said cross-head including a connecting rod, a multiple bearing structure disposed axially within the cross-head, said structure having outer races secured against axial movement to said cross-head, a stud carried by the connecting rod and having a stem extending through the bearing structure, means securing said stem to the inner races of the bearing structure, rotatable means carried by the cross-head, and a key connection between the rotary means and the cross-head.

7. In a gear shaper, a cross-head having a cutter attached thereto, means supporting the cross-head for guided axial movement, means for rotating the cross-head in its supporting means, means operating in timed relation to the rotating means for imparting reciprocatory movement to the cross-head including a crank-driven connecting rod, a rotary connection between the cross-head and the connecting rod including an axial bearing structure in the cross-head, a member retained in the bearing structure for relative rotary movement with respect to the cross-head, and a pivotal connection between the member and said reciprocating means, and a cutter relief mechanism comprising means for moving the supporting means and accompanying cross-head transversely with respect to the axis of the cross-head and to the axis of rotation of the connecting rod crank, whereby during relief movement said crank may pivot about its crank connection in the direction of relief movement of the cutter head.

8. In a gear shaper, a cross-head having a cutter attached thereto, means supporting the cross-head for guided axial movement, means for rotating the cross-head, means operating in timed relation to the rotating means for imparting reciprocating movement to the cross-head including a crank-driven connecting rod, a rotary connection between the connecting rod and cross-head including a connecting member for directly coupling the connecting rod with the cross-head, said member having a swivel connection with one of the connected elements and a pivotal connection with the remaining element, and adjusting means incorporated in one of said connections for changing the effective length of the connecting member.

9. In a gear shaper, a cross-head having a cutter attached thereto, means supporting the cross-head for guided axial movement, means for rotating the cross-head, means operating in timed relation to the rotating means for imparting rotary movement to the cross-head including a crank and a connecting rod driven by the crank, a rotary connection between the end of the crank and the cross-head including an axial bearing structure in the cross-head, a member retained in the bearing structure for relative rotary movement with respect to the cross-head, and a pivotal connection between the member and said reciprocating means, and means for adjusting the stroke of said crank.

10. In a gear shaper, a machine base having an upstanding pedestal thereon, a drive mechanism mounted on the top of said pedestal and including a driven crank, a connecting rod depending from the crank, a cutter head carried by the pedestal, a tool carrying cross-head mounted for guided vertical axial movement in the cutter head, a rotary connection between the end of the connecting rod and the cross-head including a connecting member for directly coupling the connecting rod with the cross-head, said member having a swivel connection with one of the connected elements and a pivotal connection with the remaining element, and means operating in timed relation to the crank for rotating said cross-head.

11. In a gear shaper, a machine base having an upstanding pedestal thereon containing a compartment, a drive mechanism mounted on top of said pedestal and including a driven crank, a connecting rod depending from the crank, a cutter head carried on the exterior of the pedestal, a tool carrying cross-head mounted for guided vertical axial movement in the cutter head, a rotary connection between the end of the connecting rod and the cross-head including a connecting member for directly coupling the connecting rod with the cross-head, said member having a swivel connection with one of the connected elements and a pivotal connection with the remaining element, and means operating in timed relation to the crank for rotating said cross-head including a change speed transmission carried in said compartment and having a connection with said drive mechanism.

12. In a gear shaper, a machine base having an upstanding pedestal thereon containing a compartment, a drive mechanism mounted on top of said pedestal and including a driven crank, a connecting rod depending from the crank, a cutter head carried on the exterior of the pedestal, a tool carrying cross-head mounted for guided vertical axial movement in the cutter head, a rotary connection between the end of the connecting rod and the cross-head including a connecting member for directly coupling the connecting rod with the cross-head, said member having a swivel connection with one of the connected elements and a pivotal connection with the remaining element, means operating in timed relation to the crank for rotating said cross-head including a change speed transmission carried in said compartment and having a connection with said drive mechanism, and a manually operable clutch connection between said drive mechanism and said transmission whereby the rotary movement of the cross-head may be controlled.

WILLIAM E. SYKES.